March 2, 1954  P. L. REYNOLDS  2,670,750
FUSE VALVE
Filed April 11, 1949  2 Sheets-Sheet 1
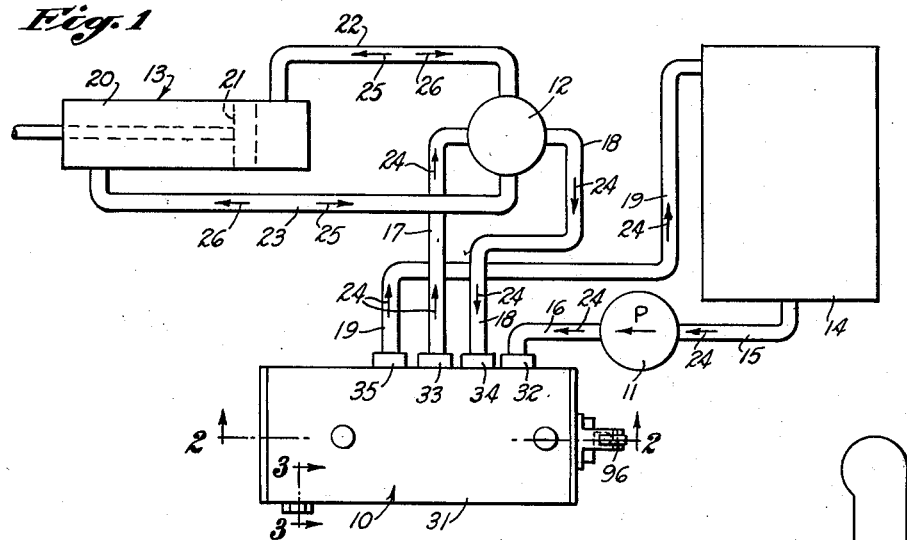
Fig. 1
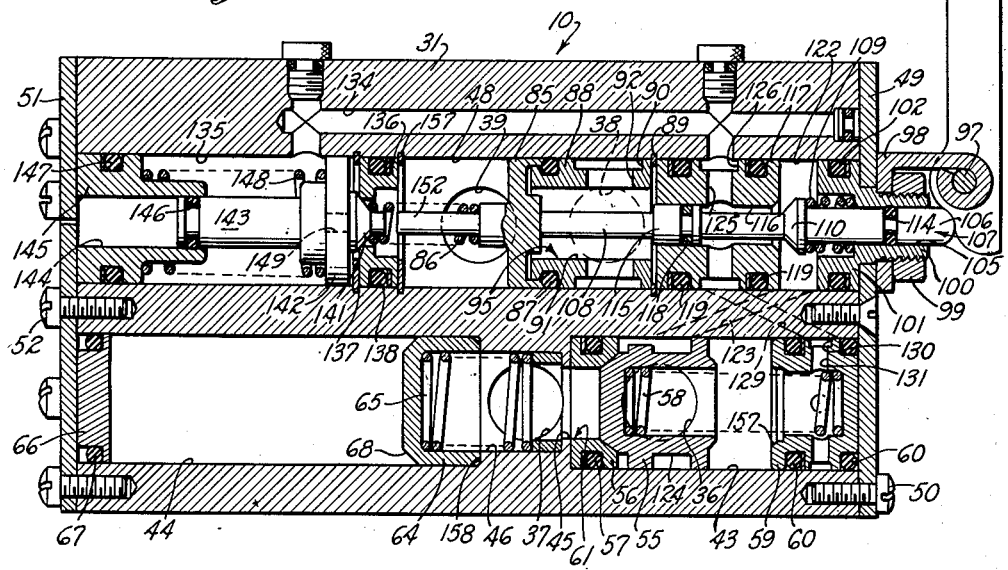
Fig. 2
Fig. 3
INVENTOR:
PHILIP L. REYNOLDS
BY HIS ATTORNEYS
HARRIS, KIECH, FOSTER & HARRIS March 2, 1954 P. L. REYNOLDS 2,670,750
FUSE VALVE
Filed April 11, 1949 2 Sheets-Sheet 2

INVENTOR:
PHILIP L. REYNOLDS
BY HIS ATTORNEYS
HARRIS, KIECH, FOSTER & HARRIS

Patented Mar. 2, 1954

2,670,750

UNITED STATES PATENT OFFICE 2,670,750

FUSE VALVE

Philip L. Reynolds, Jackson, Mich., assignor, by mesne assignments, to Howard Field, Jr., Los Angeles, Calif.

Application April 11, 1949, Serial No. 86,786

18 Claims. (Cl. 137—87)

My invention relates in general to valves and, more particularly, to valves which permit passage of fluid through fluid lines connected thereto only if such fluid lines are intact, valves of this character commonly being referred to as fuse valves. A primary object of the invention is to provide an improved valve of this type.

The invention is of particular utility in aircraft hydraulic systems and will be considered in connection with such a system for purposes of illustration. However, it will be understood that the invention is susceptible of application to other installations and that I do not intend to be limited to the particular illustrative application elected for consideration herein.

An aircraft hydraulic system normally includes one or more double-acting hydraulic units for each movable component which is to be hydraulically actuated. For example, such movable components of an airplane as its landing gear, flaps, control surfaces and the like may be hydraulically actuated. Each hydraulic unit comprises a cylinder having a piston therein which is mechanically connected to the component to be actuated, and is controlled by a four-way selector valve which is connected to the ends of the cylinder by fluid lines. Such a hydraulic system also includes a pump and a reservoir connected to the inlet of the pump, the selector valve being connected to the outlet of the pump and to the reservoir by additional fluid lines. As is well known in the art, the selector valve may be moved from an inoperative or closed position, wherein no fluid flow occurs, to either one of a pair of operative or open positions, one end of the hydraulic cylinder being connected to the pump and the other end to the reservoir when the selector valve is in one of its operative positions, and the connections being reversed when the selector valve is in its other operative position.

If, in such a hydraulic system, one of the fluid lines connected to the hydraulic unit breaks for any reason, all of the fluid may bleed from the system to render it inoperative. Such fluid line breakage may result from vibrational stresses, or, in the case of military aircraft, from enemy action.

In order to prevent excessive loss of fluid from the system in the event of line breakage, fuse valves are usually inserted in the fluid lines leading to one or more hydraulic units, such valves being adapted to interrupt fluid flow in the event of breakage of the fluid lines connected thereto. Ordinarily, such fuse valves are located as close as possible to the pump and reservoir to minimize the length of the unprotected fluid lines. An example of a prior fuse valve employed for this purpose may be found in the application of Robert B. Sprague and Searle G. Nevius, Serial No. 478,102, filed March 5, 1943, now Patent Number 2,478,210, an object of the present invention being to provide a fuse valve which is an improvement on that disclosed in the aforementioned application.

Another object of the invention is to provide a fuse valve which includes displacement and metering means for sending a sample or test stream of fluid through the lines connected to the hydraulic unit associated with the valve to determine whether the lines connecting the unit and the valve are intact. More specifically, an object of the invention is to provide a fuse valve which includes means for metering fluid into the pressure line leading to the hydraulic unit, and which includes displacement means for introducing additional fluid into such pressure line from an accumulator.

Another object is to provide a fuse valve having means for terminating the test stream after a predetermined quantity of fluid has been introduced into the pressure line leading to the hydraulic unit.

An important object of the present invention is to provide a fuse valve capable of introducing into the pressure line leading to the hydraulic unit a sample of fluid which is substantially independent of the viscosity of the fluid employed, and which is, therefore, substantially independent of temperature. In other words, an object of my invention is to provide a fuse valve which will introduce into the pressure line substantially the same quantity of test fluid in extremely cold and in extremely hot climates.

Another object is to provide a fuse valve wherein the volume of the accumulator is small compared to the sample of fluid.

A further object is to provide a fuse valve having a main or primary valve which may be opened either manually, or in response to a return flow of fluid from the hydraulic unit to which the fuse valve is connected.

An important object of the invention is to provide a fuse valve wherein the main or primary valve is hydraulically actuated to minimize the forces required for manual operation thereof.

Another object is to provide a fuse valve having a minimum number of parts and one which may be manufactured and serviced readily.

The foregoing objects and advantages of the present invention, together with various other objects and advantages which will become apparent, may be attained through the employment of the exemplary embodiment illustrated in the accompanying drawings and described in detail hereinafter. Referring to the drawings:

Fig. 1 is a diagrammatic view of a hydraulic system incorporating a fuse valve which embodies the invention;

Fig. 2 is a sectional view of the fuse valve of the invention and is taken along the broken line 2—2 of Fig. 1;

Fig. 3 is a fragmentary sectional view taken along the broken line 3—3 of Fig. 1.

Figure 4:
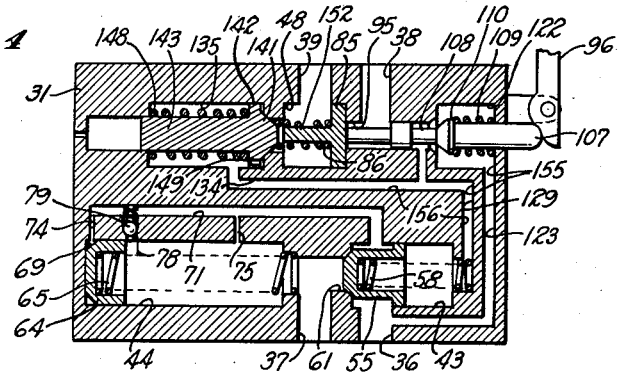
Figs. 4 to 7 are semidiagrammatic views illustrating successive events in the operating cycle of the fuse valve of the invention.

Referring particularly to Fig. 1 of the drawings, the numeral 10 designates a fuse valve which embodies the invention, the fuse valve being shown in a hydraulic system which includes a pump 11, a four-way selector valve 12, a double-acting hydraulic unit 13 and a reservoir 14. The inlet of the pump 11 is connected to the reservoir 14 by a fluid line 15 and the outlet of the pump is connected to the fuse valve 10 by a primary inlet or pressure inlet line 16. The fuse valve 10 is connected to the selector valve 12 by a primary outlet or pressure outlet line 17, and is also connected thereto by a secondary inlet or return inlet line 18. The fuse valve 10 is connected to the reservoir 14 by a secondary outlet or return outlet line 19. The hydraulic unit 13 comprises a cylinder 20 having a piston 21 therein, the ends of the cylinder 20 being connected to the selector valve 12 by fluid lines 22 and 23. As will be discussed in more detail hereinafter, the fuse valve 10 controls fluid flow through the lines 17 and 18, the selector valve 12, the lines 22 and 23, and the hydraulic unit 13.

The selector valve 12 is movable from an inoperative or closed position to either one of a pair of operative or open positions, there being no flow through the system when the selector valve is closed, assuming the lines 17 and 18 are intact. When the selector valve 12 is in either of its open positions, and assuming that the lines 17, 18, 22 and 23 controlled by the fuse valve 10 are intact, flow through the lines 15 to 19 is in the directions indicated by the arrows 24. When the selector valve 12 is in one of its open positions, flow through the lines 22 and 23 is in the direction of the arrows 25 to move the piston 21 to the left as viewed in Fig. 1 of the drawings, and when the selector valve is in the other of its open positions, flow through the lines 22 and 23 is in the direction of the arrows 26 to move the piston 21 to the right as viewed in Fig. 1 of the drawings.

Considering the fuse valve 10 in more detail with particular reference to Figs. 1 and 2 of the drawings, it includes a housing or housing means 31 provided with bosses 32, 33, 34 and 35, the boss 32 being provided with a primary inlet or pressure inlet port 36 which may be threaded (not shown) to receive the primary inlet or pressure inlet line 16, the boss 33 being provided with a primary outlet or pressure outlet port 37 which may be threaded to receive the primary outlet or pressure outlet line 17, the boss 34 being provided with a secondary inlet or return inlet port 38 which may be threaded to receive the secondary inlet or return inlet line 18, and the boss 35 being provided with a secondary outlet or return outlet port 39 which may be threaded to receive the secondary outlet or return outlet line 19. The housing 31 is provided with a main or primary valve chamber 43 which extends inwardly from one end thereof and is provided with an accumulator or accumulating chamber 44 which extends inwardly from the opposite end thereof and which is aligned with the main valve chamber 43 in the particular construction illustrated. The main valve chamber and the accumulating chamber are interconnected by a bore 45 and a counterbore 46. The housing 31 is also provided with a bore therethrough which provides a secondary valve chamber 48. The outer end of the primary valve chamber 43 and one end of the bore forming the secondary valve chamber 48 are closed by a cover plate 49 which is secured to the housing 31 by screws 50, or the like. Similarly, the outer end of the accumulating chamber 44 and the other end of the bore forming the secondary valve chamber 48 are closed by a cover plate 51 which is secured to the housing 31 by screws 52, or the like.

Reciprocable in the primary valve chamber 43 is a main or primary valve 55 of the poppet type, the primary valve 55 being adapted to engage an annular seat 56 which is disposed in the primary valve chamber and which abuts a shoulder at the junction of the primary valve chamber with the bore 45. The annular seat 56 carries an annular sealing element, exemplified as an O-ring 57, for preventing leakage past the outer periphery thereof. The primary valve 55 is biased toward a closed position wherein it engages the annular seat 56 by a spring 58 which is seated against a cup-shaped element 59 disposed in the primary valve chamber 43. The element 59 carries spaced O-rings 60 for preventing leakage past the outer periphery thereof.

The pressure inlet port 36 communicates with the primary valve chamber 43 adjacent the annular seat 56 and the pressure outlet port 37 communicates with the counterbore 46 so that fluid delivered to the pressure inlet port by the pump 11 may flow through the primary valve chamber 43, the annular seat 56, the bore 45 and the counterbore 46 into the pressure outlet port when the primary valve 55 is disengaged from the annular seat. The primary valve chamber 43, the annular seat 56, the bore 45 and the counterbore 46 will hereinafter be regarded as collectively forming a main or primary passage 61 which connects the pressure inlet and outlet ports 36 and 37 and which is adapted to be closed by the primary valve 55.

Disposed in the accumulating chamber 44 is a fluid separating means, exemplified as a piston 64, which is adapted to displace fluid from the accumulating chamber through the counterbore 46 into the pressure outlet port 37 as will be discussed in more detail hereinafter. The displacement piston 64 is biased toward the left, as viewed in the drawings, by a spring 65 which is seated against a sleeve abutting the shoulder formed at the junction of the bore 45 with the counterbore 46. Movement of the piston 64 under the influence of the spring 65 is limited by an element 66 which carries an O-ring 67 for preventing leakage past the outer periphery thereof. The displacement piston 64 is beveled at 68 to provide an annular space 69 between the piston and the element 66 when the piston is in the position shown in Fig. 4 of the drawings.

As best shown in Figs. 4 to 7 of the drawings, formed in the housing 31 adjacent the accumulating chamber 44 is a passage 71 which communicates with the pressure inlet port 36, with the annular space 69 in the accumulating chamber 44 adjacent the element 66 through an orifice or passage 74, and with the accumulating chamber adjacent the primary valve chamber 43 through an auxiliary or metering orifice or passage 75, the effective cross sectional area of the passage 74 being controlled by a valve 76, shown in Fig. 3 of the drawings, in a bore 77 in the housing 31. The passage 71 also communicates with the accumulating chamber 44 at a point intermediate the passages 74 and 75 through a passage 78, flow into the accumulating chamber from the passage 71 through the passage 78 being prevented by a spring-biased check valve 79.

As will be discussed in more detail hereinafter, fluid under pressure may flow from the pressure inlet port 36 through the passages 71 and 74 into the space 69 between the element 66 and the displacement piston 64 to move the latter to the right, as viewed in the drawings, thereby displacing fluid from the accumulating chamber 44 into the pressure outlet port 37. The metering passage 75 is, in effect, in parallel with the primary passage 61 and permits limited flow of fluid from the pressure inlet port 36 to the pressure outlet port 37 around the primary valve 55, as will be discussed in more detail hereinafter. The displacement piston 64 is adapted to prevent flow from the pressure inlet port 36 to the pressure outlet port 37 by way of the metering passage 75 as it moves from left to right in the accumulating chamber 44, as viewed in Figs. 5 and 6 of the drawings. Thus, the displacement piston 64 also serves as a valve means for terminating flow from the pressure inlet port 36 to the pressure outlet port 37 by way of the metering passage 75.

Figure 6:
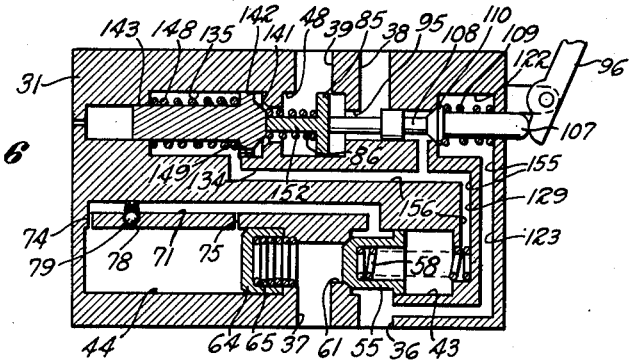
Figure 7:
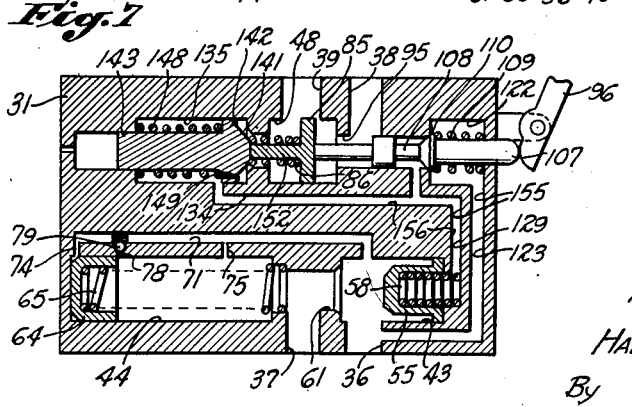

Referring again to Fig. 2 of the drawings, the return inlet and outlet ports 38 and 39 communicate with the secondary valve chamber 48 at a pair of spaced points, and reciprocable in the secondary valve chamber is a secondary valve 85 of the piston type. The secondary valve 85 is biased toward a closed position by a spring 86 and, when it is in its closed position, it engages an annular sealing element, exemplified as an O-ring 87, which is carried by an element 88 disposed in the bore forming the secondary valve chamber 48 and seated against a snap ring 89 therein. The element 88 is provided with an annular groove 90 which registers with the return inlet port 38 and which communicates with an axial bore 91 in the element 88 through radial openings 92 therein. The annular groove 90, the radial openings 92, the bore 91 and the secondary valve chamber 48 may be regarded as providing a secondary passage, indicated generally by the numeral 95, which connects the return inlet and outlet ports 38 and 39. As will be apparent from Figs. 2, 4 and 5 of the drawings, the O-ring 87 is disposed between the return inlet and outlet ports 38 and 39 so that the secondary valve 85, when in its closed position wherein it engages the O-ring 87, closes the secondary passage 95 between the return inlet and outlet ports. As shown in Figs. 6 and 7, when the secondary valve 85 is in its open position, it opens the secondary passage 95.

As viewed in the drawings, the left side of the secondary valve 85 is exposed to fluid pressure in the return outlet port 39 and the right side thereof is exposed to fluid pressure in the return inlet port 38 so that the secondary valve will be moved to an open position to open the secondary passage 95 whenever the fluid pressure in the return inlet port exceeds that in the return outlet port by an amount sufficient to overcome the net spring force applied to the secondary valve 85. Preferably, this net spring force, which is produced by the spring 86 and a spring 109 to be discussed later, is sufficient to prevent opening of the secondary valve 85 if the fluid pressure in the return inlet port 38 is only slightly higher than that in the return outlet port 39, which would be the case if the return inlet line 18 connected to the return inlet port were damaged sufficiently to permit excessive loss of fluid therefrom.

In addition to being movable to an open position by a predetermined pressure differential thereacross in the foregoing manner, the secondary valve 85 may be moved to an open position manually by a lever 96 pivotally connected at 97 to a bracket 98 which is clamped between the coverplate 49 and a nut 99. The latter is threaded on a stem 100 of an element 101 which is disposed in the bore forming the secondary valve chamber 48 and which carries an O-ring 102 to prevent leakage therepast, the stem 100 extending through openings in the coverplate 49 and the bracket 98. Slidably disposed in a bore 105 through the element 101 is the head 106 of a plunger 107 having a stem 108 which is adapted to engage and open the secondary valve 85 during movement of the plunger toward the left, as viewed in the drawings. The lever 96 is adapted to engage the head 106 of the plunger 107 to produce such movement of the plunger. The plunger 107 is biased into engagement with the secondary valve 85 by the aforementioned spring 109, which is seated against the element 101 and against an integral collar 110 on the plunger 107. It will be noted that the plunger spring 109 opposes the secondary valve spring 86 and, in order to prevent opening of the secondary valve 85 by the plunger spring 109, the spring force applied to the secondary valve by the plunger spring is made smaller than that applied to the secondary valve by the secondary valve spring. As previously indicated, the net spring force applied to the secondary valve 85 is preferably sufficient to prevent opening of the secondary valve if the fluid pressure in the return inlet port 38 is only slightly higher than that in the return outlet port 39.

It will be noted that the head 106 of the plunger 107 carries an O-ring 114 to prevent leakage past the plunger head through the bore 105 in the element 101. It will also be noted that the stem 108 of the plunger 107 carries an integral collar 115 which is slidable in a bore 116 through an element 117 which is disposed intermediate the element 88 and 101 and seated against the snap ring 89, the collar 115 carrying an O-ring 118 to prevent leakage therepast. The element 117 carries a pair of spaced O-rings 119 to prevent leakage therepast. The function of the element 117 will be discussed in more detail hereinafter.

The collar 110 on the plunger 107 is disposed in a space 122 between the elements 101 and 117 and is provided with a tapered surface which is adapted to seat against a complementary surface at one end of the bore 116 in the element 117 to close this bore. Thus, the collar 110 serves as a valve and will be referred to as such hereinafter. The housing 31 is provided with a passage 123 which communicates at one end with the space 122 and at its other end with the primary valve chamber 43 at a point adjacent the annular seat 56 for the primary valve 55, the latter being provided with a portion 124 of reduced diameter around which fluid may flow from the pressure inlet port 36 into the passage 123. Thus, the space 122 between the elements 101 and 117 communicates with the pressure inlet port 36 at all times. When the valve 110 is open, fluid from the space 122 may flow through the bore 116 in the element 117 into radial openings 125 in this element, and thence into an annular groove 126 therein, the annular groove being disposed between the O-rings carried by the element 117 so that leakage from the groove is prevented. The housing 31 is provided with a passage 129 which communicates at one end with the annular groove 126 in the element 117 and which communicates at its other end with an annular groove 130 in the element 59 in the primary valve chamber 43, the annular groove 130 being disposed between the O-rings carried by the element 59 so as to prevent leakage from this groove. The annular groove 130 communicates with the primary valve chamber 43 through radial openings 131 in the element 59.

It will be apparent that when the secondary valve 85 is closed, the valve 110 is open so that the fluid pressure obtaining in the pressure inlet port 36 is communicated to the space between the element 59 and the primary valve 55 by way of the annular space around the reduced diameter portion 124 of the primary valve, the passage 123 in the housing 31, the space 122 between the elements 101 and 117, the valve 110, the bore 116 in the element 117, the radial openings 125 in the element 117, the annular groove 126 in the element 117, the passage 129 in the housing 31, the annular groove 130 in the element 59 and the radial openings 131 in the element 59. Thus, the fluid pressure obtaining in the pressure inlet port 36 is applied to the right side of the primary valve 55, as viewed in the drawings, thereby biasing the primary valve toward its closed position i. e., biasing the primary valve into engagement with its annular seat 56. However, when the secondary valve 85 is in its open position, the plunger spring 109 closes the valve 110 carried by the plunger 107 to prevent application of the fluid pressure obtaining in the pressure inlet port 36 to the right side of the primary valve 55. Also, when the secondary valve 85 is in its open position, the space between the primary valve 55 and the element 59 is vented to the return outlet port 39 to permit the primary valve 55 to move to its open position, as will be described in the following paragraphs.

The housing 31 is provided with a passage 134 which communicates at one end with the annular groove 126 in the element 117 and at its other end with a valve chamber 135 which is provided by a portion of the bore forming the secondary valve chamber 48, the valve chamber 135 being separated from the secondary valve chamber 48 by an annular element 136 which is retained by snap rings 157 and which carries an O-ring 138 to prevent leakage therepast. The element 136 provides a seat for a valve 141 which is disposed in the valve chamber 135 and which is provided with an integral collar 142 in sliding relation with the peripheral wall of the valve chamber 135. The valve 141 is also provided with a stem 143 which is slidable in a bore 144 in an element 145 in the valve chamber 135, the valve stem 143 carrying an O-ring 146 and the element 145 carrying an O-ring 147 to prevent leakage therepast. The valve 141 is biased toward a closed position wherein it engages the element or seat 136 by a spring 148 which is seated at one end against the collar 142 on the valve 141 and at its other end against the element 145.

It will be noted that when the valve 141 is in its closed position, it prevents fluid flow between the valve chamber 135 and the secondary valve chamber 48. However, when the valve 141 is open, fluid may flow from the valve chamber 135 into the secondary valve chamber 48 by way of one or more openings 149 in the collar 142 on the valve 141.

It will be noted that the secondary valve 85 is provided with a stem 152 thereon which is adapted to engage the valve 141 to open it when the secondary valve is opened. It will also be noted that the valve 141 serves as a seat for the spring 86 which biases the secondary valve 85 toward its closed position, it being necessary for the spring force of the spring 86 to be less than that of the spring 148 to prevent the spring 86 from holding the valve 141 open when the secondary valve 85 is closed.

Considering the function of the valve 141, it will be recalled that opening of the secondary valve 85 by fluid pressure in the return inlet port 38, or manually by the lever 96, results in closing of the valve 110 carried by the plunger 107 to cut off fluid communication between the pressure inlet port 36 and the space between the primary valve 55 and the element 59. As shown in Figs. 6 and 7, opening of the secondary valve 85 also results in opening of the valve 141 so that the space between the primary valve 55 and the element 59 is vented to the return outlet port 39 by way of the radial openings 131 in the element 59, the annular groove 130 in the element 59, the passage 129 in the housing 31, the annular groove 126 in the element 117, the passage 134 in the housing 31, the valve chamber 135, the opening 149 through the collar 142 in the valve 141, the annular seat element 136 and the secondary valve chamber 48. This permits the primary valve 55 to open, as will be discussed in more detail in the following paragraphs.

As a matter of convenience in discussing the operation of the fuse valve 10, the various passages, grooves, etc., through which the fluid pressure obtaining in the pressure inlet port 36 is communicated to the space between the element 59 and the primary valve 55 under the control of the valve 110 are hereinafter regarded, in Figs. 4 to 7, as collectively forming a pressure passage 155. Similarly, the various passages, grooves, etc., for venting the space between the element 59 and the primary valve 55 to the pressure obtaining in the return outlet port 39 under the control of the valve 141 are hereinafter regarded, in Figs. 4 to 7, as collectively forming a vent pasage 156.

Considering the operation of the fuse valve 10 with particular reference to Figs. 1 and 4 to 7 of the drawings, it will be assumed that the selector valve 12 is in its closed position and that the various fluid lines connecting the fuse valve, the selector valve and the hydraulic unit 13 are intact. Under such conditions the various components of the fuse valve assume the positions shown in Fig. 4 of the drawings.

Referring to Fig. 4 of the drawings, since the selector valve 12 is closed, the fluid pressures obtaining in the return inlet and outlet ports 38 and 39 are equal so that the secondary valve 85 closes the secondary passage 95 under the influence of the spring force differential applied thereto by the springs 86 and 109, assuming that the lever 96 is in its inoperative position. Since the secondary valve 85 is closed, the valve 110 opens the pressure passage 155 and the valve 141 closes the vent passage 156. Since the pressure passage 155 is open, the pressure obtaining in the pressure inlet port 36 is applied to the entire right side of the primary valve 55, as viewed in the drawings. Substantially the entire left side of the primary valve 55, as viewed in the drawings, is also exposed to the fluid pressure obtaining in the inlet port 36, the reduced-diameter portion 124 of the primary valve being exposed to such fluid pressure through the passage 71 and the metering passage 75. Thus, under such conditions, the primary valve 55 is balanced, except for the area thereof in contact with the annular seat 56, and is held closed by the spring 58. Since the selector valve is closed, no fluid can flow from the pressure inlet port 36 into the pressure outlet port 37 through the metering passage 75 in parallel with the primary passage 61 so that the pressure obtaining in the pressure inlet passage is applied to the right side of the displacement piston 64, as viewed in the drawings. The same pressure is applied to the left side of the displacement piston through the passage 74 so that the displacement piston is balanced under the conditions being considered and is maintained in the position shown in Fig. 4 of the drawings by the spring 65.

Figure 5:
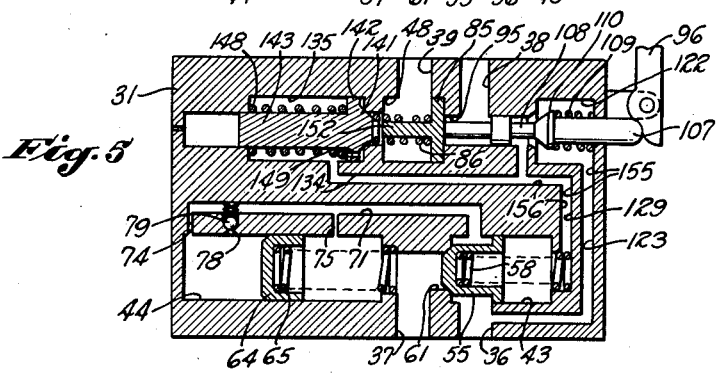

Referring now to Fig. 5 of the drawings, it will be assumed that the selector valve 12 has been moved to one of its open positions so as to admit fluid to one end of the cylinder 20. As soon as the selector valve 12 is opened, the pressure in the pressure outlet port 37 decreases so as to produce across the displacement piston 64 a pressure differential which moves the displacement piston to the right, as viewed in the drawings, against the action of the spring 65. The conditions under consideration are illustrated in Fig. 5 of the drawings wherein the displacement piston 64 is shown in an intermediate position. Such movement of the displacement piston 64 displaces fluid into the pressure outlet line 17 connected to the pressure outlet port 37, and additional fluid is metered into the pressure outlet line through the metering passage 75.

If the fluid lines 17, 18, 22 and 23 are intact, the fluid introduced into the line 17 in the foregoing manner displaces the piston 21 in its cylinder 20, whereupon the piston displaces fluid from the cylinder into the lines 22 and 18, thereby producing a return flow of fluid to the fuse valve 10. However, if any of the lines 17, 18, 22 and 23 is broken, or is damaged to such an extent that fluid is lost at an excessive rate, no return flow to the fuse valve will be established, or the return flow will be insufficient to produce in the return inlet port 38 a fluid pressure sufficient to effect the remaining events in the operating cycle of the fuse valve. Irrespective of whether the connections between the pressure outlet port 37 and return inlet port 38 are intact or damaged, the displacement piston 64 will close the auxiliary metering passage 75 as it approaches the position shown in Fig. 6 of the drawings so that only a limited amount of fluid is displaced and metered into the pressure outlet line 17. Thus, if no return flow through the fuse valve 10 is established because of the existence of broken or damaged lines, or other parts, which permit excessive loss of fluid, only a limited amount of fluid will be lost from the system, such limited amount being equal to the sum of the amount displaced by the piston 64 and the amount metered by the metering passage 75. The metering action will be discussed in more detail upon completion of the discussion of the remaining events in the operating cycle of the fuse valve 10.

Assuming now that the connections between the pressure outlet port 37 and the return inlet port 38 are intact so that a return flow is established by the piston 21 of the hydraulic unit 13, the pressure in the return inlet port 38 will exceed that in the return outlet port 39. Thus, a pressure differential for moving the secondary valve 85 from its closed position to its open position is impressed on the secondary valve, the secondary valve being shown open in Fig. 6 of the drawings. As the secondary valve 85 is opened in the foregoing manner, the valve 110 closes the pressure passage 155 and the valve 141 opens the vent passage 156 so that the pressure applied to the right side of the primary valve 55, as viewed in the drawings, is reduced to the pressure obtaining in the return outlet port 39. Thus, the valve 110 and 141 impress on the primary valve 55 a pressure differential for moving the primary valve from its closed position to its open position, the primary valve being shown in its open position in Fig. 7 of the drawings. Thus, the primary valve 55 permits fluid for operating the hydraulic unit 13 to flow from the pressure inlet port 36 directly to the pressure outlet port 37 through the primary passage 61.

As the primary valve 55 opens, the pressures applied to opposite sides of the displacement piston 64 are equalized so that the spring 65 returns the displacement piston to its initial position. Return of the displacement piston 64 to its initial position is facilitated by opening of the check valve 79 controlling flow through the passage 78.

Thus, if the connections between the pressure outlet port 37 and the return inlet port 38 are intact, the various components of the fuse valve 10 assume the positions shown in Fig. 7 of the drawings upon opening of the selector valve 12. However, if the connections between the ports 37 and 38 are not intact, the various components of the fuse valve will assume the positions shown in Fig. 5 of the drawings, except that the displacement piston will be at the end of its travel so as to close the metering passage 75. Consequently, if broken or damaged lines are encountered, the loss of fluid will be equal only to that displaced by the piston 64 and metered through the passage 75.

The fuse valve 10 may also be operated manually by rotating the lever 106 into the position shown in Figs. 6 and 7 of the drawings, thus opening the secondary valve 85 through the plunger 107. Opening of the secondary valve 85 causes the valve 110 to close the pressure passage 155 and the valve 141 to open the vent passage 156 with the result that a pressure differential is applied to the primary valve 55 to move it to its open position. It will be understood that the fuse valve 10 will normally be operated automatically, but that manual operation thereof may be desirable or necessary in some instances. For example, in the event that a damaged connection between the pressure outlet port 37 and the return inlet port 38 has been repaired, manual operation of the fuse valve 10 may be desirable to facilitate refilling the lines with fluid. Also, manual operation of the fuse valve 10 may be necessary in an emergency to permit actuation of some component of an airplane if the fluid lines leading to the hydraulic unit 13 are intact, even though one of the lines leading from the hydraulic unit may be broken. Manual operation of the fuse valve under such circumstances will entail loss of fluid from the system, but such loss may not be objectionable in an emergency.

An important feature of the present invention is that the total quantity of fluid displaced by the piston 64 and metered by the orifice or passage 75 is substantially independent of the viscosity of the fluid and is thus substantially independent of temperature so that the fuse valve will operate in substantially the same manner in extremely cold and extremely hot climates. It will be apparent that if the viscosity of the fluid is low, fluid will be metered through the passage 75 at a relatively high rate, and will flow through the passage 74 into the space 69 at a relatively high rate to displace the piston 64 at a relatively high rate. Similarly, if the viscosity of the fluid is high, the metering rate will be low and the displacement rate will be low. Thus, when the viscosity is low, the high displacement rate reduces the length of time that metering at a high rate occurs, and, when the viscosity is high, the low displacement rate increases the length of time that metering at a low rate occurs.

Thus, by employing a high displacement rate to reduce the time of metering at a high rate and a low displacement rate to increase the time of metering at a low rate, the quantity of fluid metered, and thus the total quantity of fluid metered and displaced, are maintained substantially constant despite viscosity variations arising from temperature variations, or from other causes.

In addition to being capable of delivering to the hydraulic unit 13 a fluid sample which is substantially constant with viscosity variations, the fuse valve 10 is capable of delivering thereto a fluid sample of much larger volume than the volume of displaced fluid because of the combined metering and displacement action. If desired, the volume of displaced fluid may be small compared to the volume of fluid necessary to establish return flow, the remainder of the fluid necessary to establish return flow being metered through the orifice or passage 75. Consequently, the accumulating chamber 44 may be quite small, thereby minimizing the size and weight of the fuse valve, which is an important feature of the invention. Thus, the present invention provides a fuse valve having the advantages of prior fuse valves operating on the displacement principle without the use of a large accumulating chamber.

Another feature of the present invention resides in the fact that the volume of the fluid sample may be increased or decreased readily in accordance with the requirements of different installations by the simple expedient of adjusting the valve 76 to vary the effective area of the passage 74, thereby varying the displacement rate of the piston 64 and thus varying the metering time. Thus, the fuse valve 10 may be incorporated in installations requiring fluid samples of different volume.

Another important advantage of the fuse valve 10 over prior fuse valves is that extremely small forces are required for manual operation. It will be noted that, in operating the fuse valve 10 manually, it is necessary to apply to the lever 96 a force sufficient only to overcome frictional resistance to movement of the plunger 107, the secondary valve 85 and the valve 141, to overcome the net spring force of the springs 86, 109 and 148, and to overcome any slight pressure differential applied to the plunger 107, the pressure applied to the plunger being small for an installation wherein the pressure in the reservoir 14 is equal to atmospheric. Since the primary valve 55 is actuated by the pressure differential impressed thereon by the valves 110 and 141, it is unnecessary to oppose the pressure acting on the primary valve when operating the fuse valve 10 manually in the foregoing manner, which is not true of prior fuse valves of which I am aware.

Still another feature of the present invention is that, with the exception of the O-ring 114 on the plunger head 106, the O-ring 118 on the plunger collar 115 and the O-ring 146 on the valve stem 143, no seals are employed between relatively moving parts, thereby substantially eliminating seal wear and appreciably extending the service life of the valve. The foregoing is accomplished without appreciable fluid leakage, which is another feature. For example, fluid leakage past the primary valve 55 is prevented by engagement thereof with the annular seat 56 when the primary valve is closed, and fluid leakage past the primary valve is prevented by engagement thereof with a seat 157 on the element 59 when the primary valve is open. Similarly, when the displacement piston 64 is at the end of its stroke, leakage therepast is prevented by engagement of the displacement piston with a seat 158 formed by the shoulder at the junction of the accumulating chamber 44 with the counterbore 46, there being no tendency toward leakage past the displacement piston when it is in the position shown in Fig. 4 of the drawings since the same pressure obtains on both sides thereof. When the secondary valve 85 is closed, fluid leakage therepast is prevented by the O-ring 94 and, when the secondary valve is open, it registers with the return outlet port 39 so that the same pressure obtains on both sides thereof. Leakage of fluid from the valve chamber 135 into the secondary valve chamber 48 is prevented by the valve 141. Thus, leakage is substantially eliminated without the use of seals between relatively moving parts.

Although the fuse valve 10 has been described in connection with a hydraulic system which is normally closed, as by the selector valve 12, it will be understood that it may be used in a normally open system, in which case it is normally open and closes in the event of a line break. Also, one fuse valve 10 may be used in connection with several selector valves, either in parallel in a closed system, or in series in an open system.

Although I have disclosed an exemplary embodiment of my invention herein for purposes of illustration, it will be understood that various changes, modifications and substitutions may be incorporated in the embodiment disclosed without departing from the spirit of the invention.

I claim as my invention:

1. In a valve device, the combination of: a main passage; normally closed main valve means for controlling flow of fluid through said main passage; an auxiliary, metering passage in parallel with said main passage; an accumulator; fluid separating means movable in said accumulator between two positions, said auxiliary passage bypassing said fluid separating means in at least one of said positions of said fluid separating means; a passage providing fluid communication between said main passage upstream from said main valve means and said accumulator on one side of said fluid separating means;

a passage providing fluid communication between said main passage downstream from said main valve means and said accumulator on the opposite side of said fluid separating means, said fluid separating means displacing fluid into the passage last defined during movement thereof from said one position toward the other of said positions; and means for opening said main valve means.

2. A valve device as set forth in claim 1 including auxiliary valve means carried by said fluid separating means for closing said auxiliary passage after a predetermined movement of said fluid separating means from said one position.

3. In a valve device, the combination of: housing means having a primary inlet port, a primary outlet port, a secondary inlet port, a secondary outlet port, a primary passage connecting said primary inlet and outlet ports, an auxiliary metering passage connecting said primary inlet and outlet ports, a chamber communicating at one end with said primary inlet port and at its other end with said primary outlet port, and a secondary passage connecting said secondary inlet and outlet ports; normally closed primary valve means for controlling flow of fluid through said primary passage and adapted to be opened in response to flow of fluid through said secondary passage; and fluid separating means movable in said chamber from said one end thereof toward said other end thereof to displace fluid from said chamber into said primary outlet port, said auxiliary passage bypassing said fluid separating means when said fluid separating means is at said one end of said chamber.

4. A valve device as set forth in claim 3 including auxiliary valve means carried by said fluid separating means for automatically closing said auxiliary passage after a predetermined movement of said fluid separating means from said one end of said chamber.

5. A valve device as set forth in claim 3 wherein said primary valve means is adapted to be opened by a fluid pressure differential impressed thereacross, said valve device including means operable in response to flow of fluid through said secondary passage for impressing said fluid pressure differential across said primary valve means.

6. A valve device as set forth in claim 3 wherein said primary valve means is adapted to be opened by a fluid pressure differential impressed thereacross, said valve device including means responsive to a fluid pressure difference between said secondary inlet and outlet ports for impressing said fluid pressure differential across said primary valve means.

7. In a valve device, the combination of: housing means providing a primary inlet port, a primary outlet port, a secondary inlet port, a secondary outlet port, a primary passage connecting said primary inlet and and outlet ports, and a secondary passage connecting said secondary inlet and outlet ports; normally closed primary valve means for controlling flow of fluid through said primary passage and movable to an open position by a fluid pressure differential impressed thereacross; means for discharging a predetermined quantity of fluid into said primary outlet port; and means mechanically unconnected to said primary valve means and responsive to a fluid pressure difference between said secondary inlet and outlet ports for impressing said fluid pressure differential across said primary valve means.

8. A valve device as set forth in claim 7 wherein the means last defined includes normally closed secondary valve means for controlling flow of fluid through said secondary passage and movable to an open position in response to said fluid pressure difference.

9. A valve device as set forth in claim 7 including manually operable means for actuating the means last defined in claim 10.

10. In a valve device, the combination of: housing means having an inlet port, an outlet port and a passage connecting said ports; normally closed valve means for controlling flow of fluid through said passage and movable to an open position in response to a fluid pressure differential impressed thereacross; and manually operable means mechanically unconnected to said valve means for impressing said fluid pressure differential across said valve means.

11. In a valve device, the combination of: housing means having a primary inlet port, a primary outlet port, a secondary inlet port, a secondary outlet port, a primary passage connecting said primary inlet and outlet ports, a secondary passage connecting said secondary inlet and outlet ports, a primary valve chamber, a pressure passage connecting said primary inlet port and said primary valve chamber, and a vent passage connecting said primary valve chamber and said secondary outlet port; primary valve means exposed to fluid pressure in said primary valve chamber for closing said primary passage; normally open third valve means for controlling flow of fluid through said pressure passage; normally closed fourth valve means for controlling flow of fluid through said vent passage; actuating means for closing said third valve means and for opening said fourth valve means so as to prevent fluid communication between said primary inlet port and said primary valve chamber and to provide fluid communication between said primary valve chamber and said secondary outlet port; and means for delivering a quantity of fluid to said primary outlet port independently of the position of said primary valve means.

12. A valve device as set forth in claim 11 wherein said actuating means comprises manually operable means for closing said third valve means and opening said fourth valve means.

13. A valve device as set forth in claim 11 wherein said actuating means includes means movable in response to a fluid pressure difference between said secondary inlet and outlet ports for closing said third and opening said fourth valve means.

14. A valve device as set forth in claim 13 wherein the means defined in claim 13 comprises normally closed secondary valve means for controlling fluid flow through said secondary passage.

15. In a valve device, the combination of: a main passage; normally closed main valve means for controlling flow of fluid through said main passage and movable to an open position by a fluid pressure differential impressed thereacross; a chamber; a passage connecting one end of said chamber to said main passage upstream from said main valve means; a passage connecting the other end of said chamber to said main passage downstream from said main valve means; an auxiliary, metering passage communicating with said main passage upstream from said main valve means and communicating with said chamber intermediate its ends; fluid separating means movable in said chamber from said one end thereof toward said other end thereof for displacing fluid from said chamber into said main passage downstream from said main valve means and for terminating flow of fluid from said auxiliary metering passage into said main passage downstream from said main valve means as it approaches said other end of said chamber; and means for impressing said fluid pressure differential across said main valve means.

16. In a valve device, the combination of: housing means having a primary inlet port, a primary outlet port, a secondary inlet port, a secondary outlet port, a primary passage connecting said primary inlet and outlet ports, a secondary passage connecting said secondary inlet and outlet ports, an accumulating chamber communicating at one end with said primary inlet port and at the other end with said primary outlet port, an auxiliary, restricted, metering passage connecting said primary inlet and outlet ports, a primary valve chamber, a pressure passage connecting said primary inlet port and said primary valve chamber, and a vent passage connecting said primary valve chamber and said secondary outlet port; a primary valve exposed to fluid pressure in said primary valve chamber, said primary valve being adapted to control flow of fluid through said primary passage and being biasable toward a closed position by fluid pressure in said primary valve chamber; a secondary piston valve for controlling flow of fluid through said secondary passage, said secondary piston valve having areas respectively exposed to fluid pressures in said secondary inlet and outlet ports and being biasable toward an open position by a fluid pressure difference between said secondary inlet and outlet ports; a normally open third valve for controlling flow of fluid through said pressure passage; a normally closed fourth valve for controlling flow of fluid through said vent passage; means operable in response to movement of said secondary piston valve toward an open position for closing said third valve and opening said fourth valve; a piston movable in said accumulating chamber from said one end thereof toward said other end thereof; and means on said piston for closing said restricted metering passage during movement of said piston from said one end of said accumulating chamber toward said other end thereof.

17. In a valve device, the combination of: a housing; a primary passage formed in said housing; a normally closed primary valve in said housing and controlling fluid flow through said primary passage; a metering passage formed in said housing in parallel with said primary passage and by-passing said primary valve for discharging fluid into said primary passage downstream from said primary valve; a chamber formed in said housing; displaceable fluid separating means in said chamber and communicating on one side with said primary passage upstream from said primary valve and communicating on its other side with said primary passage downstream from said primary valve for discharging fluid into said primary passage downstream from said primary valve, said fluid separating means being movable between two positions and said metering passage bypassing said fluid separating means in at least one of said positions of said fluid separating means; a secondary passage formed in said housing and connectible in series with said primary passage on the downstream side of the primary valve; and means in said housing and operable by a flow of fluid through said secondary passage for opening said primary valve.

18. A valve device according to claim 17 wherein said primary valve is adapted to be opened by a fluid pressure differential impressed thereacross, the means last defined in claim 17 including movable means in said secondary passage and responsive to a difference in fluid pressure between the upstream and downstream ends of said secondary passage, and the means last defined in claim 17 further including valve means connected to and operable by said movable means for impressing said fluid pressure differential across said primary valve.

PHILIP L. REYNOLDS.

References Cited in the file of this patent

UNITED STATES PATENTS

| Number | Name | Date |
|---|---|---|
| 2,428,150 | Field | Sept. 30, 1947 |
| 2,478,210 | Sprague | Aug. 9, 1949 |
| 2,478,211 | Sprague | Aug. 9, 1949 |
| 2,493,906 | Wishart | Jan. 10, 1950 |